United States Patent [19]

Fuchs

[11] Patent Number: 4,590,465
[45] Date of Patent: May 20, 1986

[54] GRAPHICS DISPLAY SYSTEM USING LOGIC-ENHANCED PIXEL MEMORY CELLS

[76] Inventor: Henry Fuchs, Computer Science Dept. (035A), U.N.C., Chapel Hill, N.C. 27514

[21] Appl. No.: 349,818

[22] Filed: Feb. 18, 1982

[51] Int. Cl.⁴ ............................................. G09G 1/00
[52] U.S. Cl. ................................... 340/723; 340/727; 340/729; 340/750; 340/703; 365/220
[58] Field of Search .............. 340/703, 717, 723, 729, 340/727, 750, 798, 799; 365/220, 238

[56] References Cited

U.S. PATENT DOCUMENTS

| | | |
|---|---|---|
| 3,441,789 | 4/1969 | Harrison, III ..................... 340/729 |
| 3,454,822 | 7/1969 | Harrison, III . |
| 3,473,160 | 10/1969 | Wahlstrom ........................ 364/900 |
| 3,523,289 | 8/1970 | Harrison, III . |
| 3,585,628 | 6/1971 | Harrison, III . |
| 3,602,702 | 8/1971 | Warnock ............................ 340/729 |
| 3,603,964 | 9/1971 | Harrison, III . |
| 3,639,736 | 2/1972 | Sutherland . |
| 3,665,408 | 5/1972 | Erdahl et al. . |
| 3,684,876 | 8/1972 | Sutherland . |
| 3,700,792 | 10/1972 | Harrison, III et al. . |
| 3,723,803 | 3/1973 | Harrison, III et al. . |
| 3,772,658 | 11/1973 | Sarlo ................................. 365/238 |
| 3,775,005 | 11/1973 | Szabo . |
| 3,778,810 | 12/1973 | Hayashi . |
| 3,815,095 | 6/1974 | Wester ............................... 364/200 |
| 3,816,726 | 6/1974 | Sutherland et al. . |
| 3,889,107 | 6/1975 | Sutherland . |
| 3,942,163 | 3/1976 | Goyal ................................ 365/238 |
| 3,988,728 | 10/1976 | Inoue et al. . |
| 4,060,713 | 11/1977 | Golay . |
| 4,127,849 | 11/1978 | Okor . |
| 4,184,206 | 1/1980 | Harano . |
| 4,208,719 | 6/1980 | Lotz et al. . |
| 4,208,810 | 6/1980 | Rohner et al. . |
| 4,222,076 | 9/1980 | Knowlton . |
| 4,224,600 | 9/1980 | Sellner . |
| 4,225,929 | 9/1980 | Ikeda . |
| 4,231,095 | 10/1980 | Cassagne . |
| 4,261,018 | 4/1981 | Knowlton . |

OTHER PUBLICATIONS

"Two's Complement Pipeline Multipliers," by R. F. Lyon, *IEEE Transactions on Communications*, vol. COM-24, Apr. 1976, pp. 418-425.

Chapter 22, Newman and R. F. Sproull, "Principals of Interactive Computer Graphics", 2nd ed., McGraw Hill 1979.

Chapter 8 of J. D. Foley and H. Vandam, "Fundamentals of Interactive Computer Graphics", Addison-Westley, 1982.

Sutherland et al., "A Characterization of Ten-Hidden Surface Algorithms", Computer Surveys 6(1):1 Mar. 1974.

Parke; F. I., "Simulation and Expected Performance Analysis of Multiple Processor Z-buffer Systems", *Association for Computer Machinery*, Publication No. 0-89791-021-4/80/0700-0048, pp. 46-56 (1980).

Weinberg; R., "Parallel Processing Image Synthesis and Anti-Aliasing," *Computer Graphics*, vol. 15, No. 3, pp. 55-62 (1981).

Whitted; T., "Hardware Enhanced 3-D Raster Display System", pp. 349-356, CMCCS/ACCHO (1981).

Clark, J., "Structuring a VLSI System Architecture," *Lambda*, pp. 25-30, Second Quarter (1980).

*Primary Examiner*—Marshall M. Curtis
*Attorney, Agent, or Firm*—Cushman, Darby & Cushman

[57] ABSTRACT

The present invention provides a relatively inexpensive raster-scan type graphics system capable of real time operation, utilizing logic-enhanced pixels within an image buffer, permitting parallel (simultaneous) calculations at every pixel. A typical implementation would be as custom VLSI chips. In the sequence of most general applications, each polygon is operated upon in sequence, and the image is built up as the polygons are processed without the necessity of sorting. With respect to each successive polygon, the following operations are effected: (1) all pixels within the polygon are identified; (2) the respective pixels which would be visible to the observer, that is, not obstructed by some previously processed polygon, are determined; and (3) the proper color intensities for each visible pixel are determined.

54 Claims, 4 Drawing Figures

GRAPHICS DISPLAY SYSTEM USING LOGIC-ENHANCED PIXEL MEMORY CELLS

BACKGROUND OF THE INVENTION

1. Field of the Invention

The present invention relates to a graphics display system, and in particular to raster type graphics display systems.

2. Description of the Prior Art

Graphics display systems are systems for generating images on an electronic display device from a previously generated digital data base. Graphic systems generate two-dimensional images from either two or three dimensional (3-D) object descriptions. The object descriptions are manipulated to provide images of the object as viewed from various defined viewing positions or perspectives. The following description is primarily directed to systems capable of operating upon 3-D object descriptions. Such systems are inherently capable of operation upon 2-D object descriptions. Graphic display systems tend to be of two basic types: vector display (stick figure) systems, and raster-scan video systems. Raster systems, in turn, are generally of two distinct types: real-time digital scene generators (visual simulators) and general purpose image buffer based systems, incapable of real-time image generation. However, the vector type graphics systems are incapable of providing a solid model, and the stick figure images generated tend to be confusing since lines that would normally be hidden by solid portions of the object are visible to the observer.

Examples of such vector systems are Evans & Sutherland Model PS-3000, and Vector General Model 3303. Reference in this regard is also made to U.S. Pat. Nos. 3,639,736 and 3,684,876 issued to I. Sutherland on Feb. 1, 1972 and Aug. 15, 1982, respectively.

Raster-scan systems, on the other hand, are capable of providing an apparently solid image. Real-time raster-scan systems utilize considerable highly specialized electronic circuits in order to generate a complete image within one image frame scan time (typically one-thirtieth of one second). The less expensive non-real time raster scan systems generally maintain a frame buffer having a respective addressable memory cell associated with each picture element (pixel) of the display device. The display device is typically a cathode-ray tube (CRT) having a 512 by 512 matrix of pixels. To display each scene (frame) of data, the memory matrix is scanned to drive the raster scan of the CRT.

In a standard system, the data base is a description of a world model consisting of one or more objects. Each object is nominally represented by a set of planar polygonal surfaces. Each polygon, in turn, is represented in the data base by the coordinates (x, y, z) of its respective vertices within a chosen coordinate system, and the intrinsic vertex color intensities (red, green, blue). The succeeding vertices in a polygon are provided in a conventional order e.g., counter clockwise.

To generate an image, a particular viewing position in the environment, a viewing direction and a field of view are specified. The processing typically involves translating the coordinates of the vertices into a new coordinate system relating to the specified viewing position and direction, and a clipping process is performed to eliminate portions of the polygon outside of the current field of view. The polygon data is then scaled to provide proper perspective, and transformed (if necessary) into coordinates of the display device.

The above-described calculations may be performed in general purpose or special purpose computers. Various commercial systems which provide the above described geometric transformations in real time are available, such as the Vector General 3303, or Evans and Sutherland PS-300. For a detailed description of such techniques, reference is made to: Chapter 22 of Newman and R. F. Sproull, "Principals of Interactive Computer Graphics," second edition, McGraw Hill 1979; and Chapter 8 of J. D. Foley and H. VanDam, "Fundamentals of Interactive Computer Graphics," Addison-Westley 1982.

The intrinsic color intensity at each vertex is then modified by a function of the light reflected toward the viewer at the vertex, the direction and distances to light sources, the surface reflectivity and various other factors which may be desired.

A calculation is then performed to determine which pixels in each polygon would be visible to the viewer. For a description of prior art visibility calculation techniques, reference is made to: Sutherland et al, "A Characterization of Ten-Hidden Surface Algorithms," Computing Surveys 6(1):1 March 1974.

The color intensity values for each pixel are then computed, typically by interpolation from the respective intensity values at the polygon vertices.

The visibility and shading and color computations are exceedingly time consuming in that individual visibility determinations and intensity values must be determined for each of more than 250 thousand individual pixels in the 512 by 512 matrix. Accordingly, the real time digital scene generation systems (capable of providing real time operation) are exceedingly expensive.

SUMMARY OF THE INVENTION

The present invention provides a relatively inexpensive raster-scan type graphics system capable of real time operation, utilizing logic-enhanced pixels within the image buffer, permitting parallel (simultaneous) calculations at every pixel. A typical implementation would be as custom VLSI chips. The system can effect various processing sequences. In the sequence of most general applications, each polygon is operated upon in sequence, and the image is built up as the polygons are processed without the necessity of sorting. With respect ot each successive polygon, the following operations are effected: (1) all pixels within the polygon are identified; (2) the respective pixels which would be visible to the observer, that is, not obstructed by some previously processed polygon, are determined; and (3) the proper color intensities for each visible pixel determined.

Each of the aforementioned operations is performed simultaneously (i.e. in parallel) for each pixel in the polygon, utilizing what may be termed an enhanced memory cell associated with each pixel. Further processing circuit efficiencies are achieved by using a single circuit for all of the above noted operations. This is made possible by use of a representation method amenable to all three operations, namely the value of a variation of the expression $F(x,y) = Ax + By + C$, is calculated for each pixel memory cell where x, y are the coordinates of the pixel in the image. Further, processing and space efficiencies are realized by the capability of the system to calculate the expression without necessitating the x,y address to be explicitly specified in any location. A special purpose computer calculates the respective coefficients for the various equations, and signals indicative of the coefficients are applied to what may be termed serial multiplier trees. The multiplier trees generate values for Ax, By and C for every value of x, and every value of y in the pixel matrix. The respective Ax, and By and C values are combined in the individual enhanced memory cells corresponding to the x and y values.

BRIEF DESCRIPTION OF THE DRAWING

A preferred exemplary embodiment will hereinafter be described in conjunction with the appended drawing wherein like numerals denote like elements and.

DESCRIPTION OF THE PREFERRED EXEMPLARY EMBODIMENTS

Figure 1:
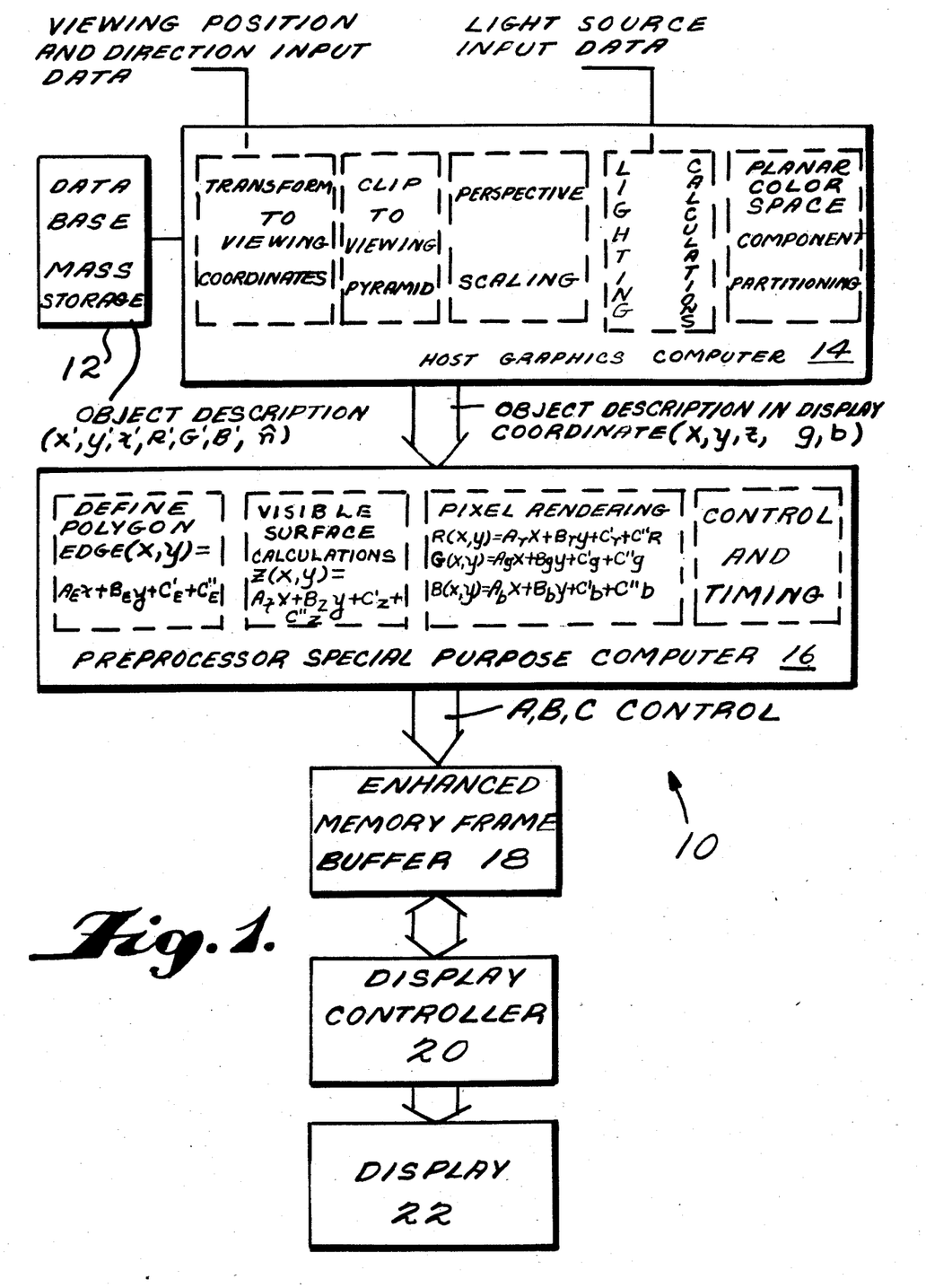
FIG. 1 is a schematic block diagram of a graphic display system in accordance with the present invention.

Referring now to FIG. 1, a graphic system 10 in accordance with the present invention comprises a suitable mass storage device 12, a suitable host graphics computer 14, a preprocessor computer 16, an enhanced memory frame buffer 18, a conventional display controller 20, and a conventional display device 22.

Mass storage device 12 may be a separate conventional magnetic disk device or can be an integral part of host graphics computer 14, i.e., the main memory of computer 14. Mass storage device 12 contains a previously generated data base comprising a digital representation of the world model. As previously noted, the objects in the model are nominally divided into a plurality of convex polygonal surfaces having arbitrary numbers of sides. The respective polygons are represented in the data base as a sequence of data words each corresponding to a vertex of the polygon. By convention, the vertices of the polygon are sequenced in, for example, a counter-clockwise direction within the data group. A one bit flag in the corresponding data word is utilized to indicate the last vertex.

Each vertex data word suitably comprises a plurality of fields representing the coordinates of the vertex in a chosen coordinate system (x', y', z'), the intrinsic color intensities present at the vertex (R', G', B'), and a vector indicating the unit normal to the polygon surface at the vertex.

Host computer 14 may be a standard general purpose computer, such as a DEC VAX 11/780. Preferably host computer 14 is a special purpose device utilizing an AMD 2900 family integrated circuit and TRW monolithic multipliers. In general, host computer 14 receives control input data from a user defining a particular viewing position and direction (i.e. viewpoint), and any light sources to be considered, and translates the base data from mass storage 12 into a display coordinate system defined in accordance with the perspective of the viewing position and light sources. In other words, host graphics computer 14, in effect, converts the data base into a description of the object in "display coordinates" and provides a sequence of data words representing the vertices of respective sequential convex polygons in the display coordinate system. Each vertex data word (x, y, z, R, G, B) suitably comprises a x field; a y field, a z field, a R field, a G field, and a B field, representing the x, y and z coordinates of the vertex in display coordinate system and the intrinsic red, green and blue intensity values at the vertex.

If desired, host graphics computer 14 can also operate to ensure that each polygon represents a plane in color space. In its most basic form, such operation can be accomplished by breaking each N-sided polygon into (N−2) triangles, each sharing a common vertex (the first vertex processed). The basic approach may, however, require operation by the system upon a larger than necessary number of polygons (triangles). Accordingly, it is desirable to break the respective polygons into as few component polygons as possible. This can be accomplished by determining the equation for the plane of the first triangle in color space i.e. R,G,B, as will be hereinafter explained, then inserting the data values of the respective successive vertices, in sequence, to determine if they conform with the calculated equation. If the data associated with a successive vertex conforms to the equation, the vertex is included in the planar polygon. If the vertex data does not conform to the planar equation, a new component polygon is nominally formed and the computation repeated in respect of the new component polygon.

Successive groups of vertex data words from host graphics computer 14 representing a successive polygon are applied to and stored in special purpose preprocessor computer 16. Preprocessor 16 and enhanced memory frame buffer 18 then cooperate to generate appropriate data signals to display controller 20, which in turn drives standard display device 22, suitably a cathode ray tube. For each successive polygon, all pixels within the polygon are first identified. Those of the pixels within the polygon which would be visible to the observer (i.e. not obstructed by some previously processed polygon) are then determined. The proper color intensities (R, G, B) for each unobstructed pixel in the polygon are established in the corresponding memory cells. The process is repeated for each polygon in the frame (scene), and the ultimate result selectively provided to display controller 20 to drive display 22.

Preprocessor 16 is suitably a special purpose or general purpose computer capable of computing the values of the coefficients in a number of variations of the expression $F(x,y) = Ax + By + C$ from the vertex data groups, where x and y correspond to the x and y coordinates of a respective pixel in the display coordinate system. The C coefficients, for convenience, may be divided into two portions, $C'$ and $C''$, where $C' + C'' = C$. the values of the coefficients are applied to enhanced memory 18, which calculates, in parallel, the value of $F(x,y)$ for each x,y pair in the display. More particularly, after the display coordinate vertex data for a polygon is applied to preprocessor 16, preprocessor 16 and enhanced memory 18 cooperate to determine, with respect to each pixel in the display coordinate system, whether or not the pixel is within the interior of the polygon. All exterior pixels are, in effect, disabled with respect to further processing of the particular polygon data group. Preprocessor 16 successively calculates, from the vertex data, the coefficients of "edge" equations representing the lines connecting successive vertices of the polygon. The edges of the polygon, i.e. lines between successive vertices, can be represented by the equation:

$$EDGE(x,y) = A_E x + B_E y + C_E + C'_E \quad (1)$$

The coefficients A, B, C of EDGE(x,y) are calculated by taking the differences in the x and y values for successive vertices. Assuming the polygon to be traversed in a counter clockwise direction, with respect to successive vertices $(x_i, y_i)$ and $(x_{i+1}, y_{i+1})$:

$$-(y_{i+1}-y_i)x + (x_i - x_{i+1})y + (y_{i+1}-y_i)x_i - (x_{i+1}-x_i)y_i = 0 \quad (2)$$

Thus;

$$A_E = -(y_{i+1} - y_i) \quad (3)$$

$$B_E = (x_{i+1} - x_i) \quad (4)$$

$$C_E = -x_i A_E \quad (5)$$

$$C'_E = -y_i B_E \quad (6)$$

The coefficients for the edge are provided to enhanced memory 18, which calculates the value of the edge equation for each pixel, in parallel, and inhibits all pixels on the exterior side of the line (Edge (x,y)>0). Such operation is repeated for each edge in sequence, thus inhibiting all pixels on the exterior of the polygon with respect to further processing until reception of the next successive polygon data group.

The pixels within the polygon which would be obstructed to the viewer by a previously processed polygon are then determined and inhibited. Processor 16 calculates, from the vertex data, the coefficients of the planar equation for the polygon in z space.

$$Z(x,y) = A_z x + B_z y + C_z + C'_z \quad (7)$$

The equation is determined by calculating a plane which passes through a given point, i.e. (x, y, z) and is perpendicular to the line defined by the vector product of the first two directed line segments in the polygon. Where the first three successive vertices in the polygon are $(x_1, y_1, z_1)$, $(x_2, y_2, z_2)$ and $(x_3, y_3, z_3)$, the vector product is represented as follows:

$$\begin{vmatrix} X & Y & Z \\ (x_2 - x_1) & (y_2 - y_1) & (z_2 - z_1) \\ (x_3 - x_2) & (y_3 - y_2) & (z_3 - z_2) \end{vmatrix} \quad (8)$$

The vector product describes a line with direction numbers a, b, c, where $$a = (y_2 - y_1)(z_3 - z_2) - (y_3 - y_2)(z_2 - z_1) \quad (9)$$

$$b = (z_2 - z_1)(x_3 - x_2) - (z_3 - z_2)(x_2 - x_1) \quad (10)$$

$$c = (x_2 - x_1)(y_3 - y_2) - (x_3 - x_2)(y_2 - y_1) \quad (11)$$

The equation of the plane perpendicular to that line which passes through the first vertex, $x_1, y_1, z_1$ is therefore represented by:

$$Z(x,y) = (-a/c)x + (-b/c)y + (a/c)x_1 + (b/c)y_1 + z_1. \quad (12)$$

Thus, coefficient $A_z, B_z, C'_z$ and $C''_z$ are as follows:

$$A_z = -a/c \quad (13)$$

$$B_z = -b/c \quad (14)$$

$$C'_z = (a/c)x_1 = -A_z x_1 \quad (15)$$

$$C''_z = (b/c)y_1 + z_1 = -B_z y_1 + z_1 \quad (16)$$

The coefficients of z(x,y) are applied in serial form to enhanced memory 18, where the value of z(x,y) is calculated in parallel for each pixel. As will be explained, the calculated value is compared to a lowest previous z function value stored in the pixel. If the stored previous value is less than the newly computed z value in a given pixel, it is an indication that the point in the polygon (i.e. the pixel) is obstructed from the particular view point of interest by a previously processed polygon. The hidden pixel memory cell is accordingly disabled until the next polygon is processed and its previous contents maintained. Thus, the pixel memory cell retains indicia of the color intensities associated with the particular polygon closest to the observer (and thus visible to the observer).

A color rendering of the unobstructed pixels in the polygon is then effected. Preprocessor 16 calculates, in sequence, the planar equations for the red, green, and blue intensity planes, in a manner essentially identical to the derivation of the z plane equation.

Serial representations of the red, green and blue coefficients are applied to enhanced memory 18 in sequence. Enhanced memory 18 calculates, in parallel, intensity values for each particular pixel, and stores such values in respect of those pixels which have not previously been disabled, replacing the previous contents. Thus, when all polygons in a frame have been processed, the respective pixels contain indicia of the proper color intensities for the corresponding points in the display.

Figure 2:
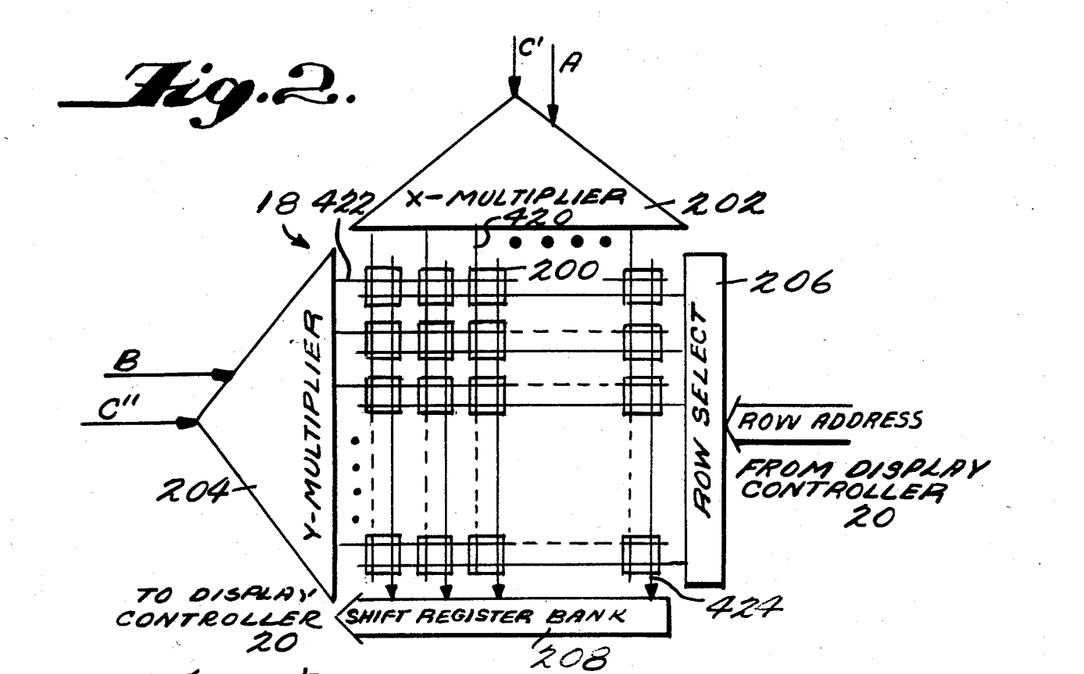
FIG. 2 is a block diagram of an enchanced memory in accordance with one aspect of the present invention.

Enhanced memory 18 will now be described with reference to FIGS. 2, 3, and 4. Referring to FIG. 2, enhanced memory 18 comprises an array of individual enhanced memory cells 200, cooperating with respective multiplier trees 202 and 204, suitable row selection decoder logic 206, and a bank of serial input parallel-output shift registers 208. Multipliers 202 and 204 will be hereinafter more fully described in conjunction with FIG. 3, and enhanced memory cells 200 will hereinafter be more fully described in conjunction with FIG. 4.

Briefly, the respective A and C', and B and C" coefficient values computed by preprocessor 16 are applied, on a bit serial basis, to X multiplier 202 and y multiplier 204, respectively. X multiplier 202 and y multiplier 204 generate a separate output signal corresponding to Ax+C' for each value of x in the display coordinate system, and By+C" for each value of y in the display coordinate system, respectively. Each output of X multiplier 202 is coupled to the cells 200 in a respective nominal associated column of cells. Similarly, each output of y multiplier 204 is coupled to the cells 200 in a respective associated nominal row of cells.

Cells 200 are also coupled to shift register bank 208. Output signals from a designated row of cells are applied to a respective portion of shift register bank 208 in response to appropriate command signals from row select decoder 206.

Figure 3:
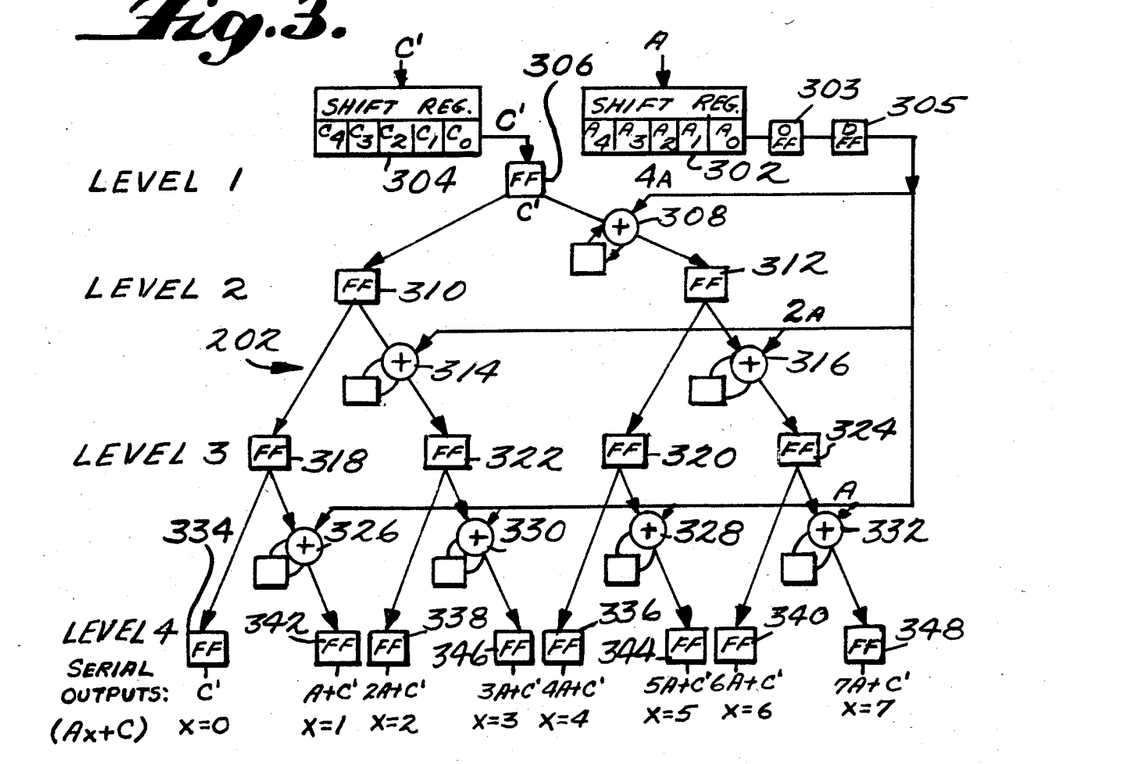
FIG. 3 is a schematic block diagram of a serial multiplier tree in accordance with one aspect of the present invention.

Referring now to FIG. 3, x multiplier 202 and y multiplier 204 will be described. For convenience of explanation, only x multiplier 202 will be specifically described. Y multiplier 204 is essentially identical except as to the coefficients applied thereto and output connections.

In general, multiplier tree 202 comprises a series of levels of simultaneously clocked storage elements (e.g. flip flops) and one bit adders with carry. The output of each flip flop is applied as an input to another flip flop nominally in the next successive level, and as one input to the adder. The output of each adder is applied to another flip flop nominally in the next successive level, and so forth. The first flip flop is receptive of a sequence of bits representing the C' coefficient (C'' for y multiplier 204). The second input of each of the respective adders is receptive of a series of bits indicative of the A coefficient (or B coefficient in the case of y multiplier 204), delayed by a number of bit periods equal to one less than the number of storage element/adder levels in the tree.

More specifically, the indicia of the A coefficient and C' coefficient are loaded into respective shift registers 302 and 304. Registers 302 and 304, may be, if desired, integral to preprocessor 16. The C coefficient is applied by register 304, in a bit serial fashion, to a flip flop 306 in the nominal first level. The output of flip flop 306 is coupled to one input of a one bit adder with carry 308 the output of which is applied to a flip flop 312 nominally in the second level. The output of flip flop 306 is also applied to the input of a flip flop 310 in the nominal second level. The outputs of flip flops 310 and 312 are applied to one input of respective one bit adders with carry (314 and 316) and to respective flip flops 318 and 320, nominally in a third level. The outputs of adders 314 and 316 are applied to further flip flops 322 and 324 respectively, in the third level. Flip flops 318, 320, 322 and 324 are, in turn, coupled to one bit adders with carry 326, 328, 330 and 332, respectively, and to flip flops 334, 336, 338 and 340, respectively in a fourth level. Adders 326, 328, 330, and 332 are similarly coupled to flip flops 342, 344, 346 and 348 in the fourth level.

The A coefficient is delayed by a number of bit periods equal to one less than the number of levels in the tree, by interposition of an appropriate number of storage elements (303, 305) after shift register 302. The delayed A coefficient is serially applied to the second input of each of the respective one bit adders. For ease of illustration, only three (and a portion) storage element/adder levels of the multiplier tree are shown, producing output signals corresponding to Ax+C for x=0 through x=7. In practice, the multipler tree includes sufficient levels (typically 9) to provide an output corresponding to each value of the x coordinate in the display (typically 0–511).

Multiplier tree 202 provides, after a sufficient number of bit periods for the data to traverse the multiplier tree, a serial representation of the sum Ax+C' for each value of x in the display array, e.g. x=0 through x=511. More particularly, recalling that delaying the serial representation of a coefficient by a bit period is equivalent to multiplying the value of the coefficient by 2, shift register 302 provides, through interposed flip flops 303 and 305, a serial signal indicative of $(2^{n-1})A$, where n equals the number of levels in the array. In the illustrated embodiment, a three level tree is shown. Accordingly, a serial signal indicative of 4A is applied to each adder in the tree, e.g. adder 308, 314, 316, 326, 328, 330 and 332.

Since multiplier tree 202 is a pipelined structure, the output signals are necessarily delayed with respect to the input signals. Accordingly, utilization of the output signals is not initiated until an appropriate number of bit periods after the initial application of the input signal bits to the tree. Elemental delays within the multiplier tree are therefore ignored.

Accordingly, flip flop 306 and adder 308 generate serial signals indicative of C and C+4A, respectively. Flip flops 310 and 312 and adders 314 and 316, thus generate serial representations of C, (4A+C), (2A+C) and (6A+C) respectively. Flip flops 318, 322, 320 and 324 therefore generate serial representations of C, 2A+C; 4A+C; and 6A+C, respectively. Adders 326, 330, 328 and 332, generate serial representation of A+C, 3A+C, 5A+C and 7A+C, respectively. Thus, flip flops 334, 342, 338, 346, 336, 344, 340 and 348 generate serial representations of C, A+C, 2A+C, 3A+C, 4A+C, 5A+C, 6A+C and 7A+C, respectively.

Referring again to FIG. 2, as will hereinafter be more fully explained, each of the output signals of x multiplier 202 is coupled to the respective pixel memory cells 200 having an x coordinate corresponding to the x value of the output signal. Similarly, each output of y multiplier 204 is coupled to each memory cell having a y coordinate corresponding to the y value of the output signal. The enhanced memory cells 200 combine the signals from x and y multiplier trees 202 and 204 to determine the value of F(x,y) for the particular pixel's coordinates, and under the control of preprocessor 16, effect predetermined operations on the calculated function value.

Figure 4:
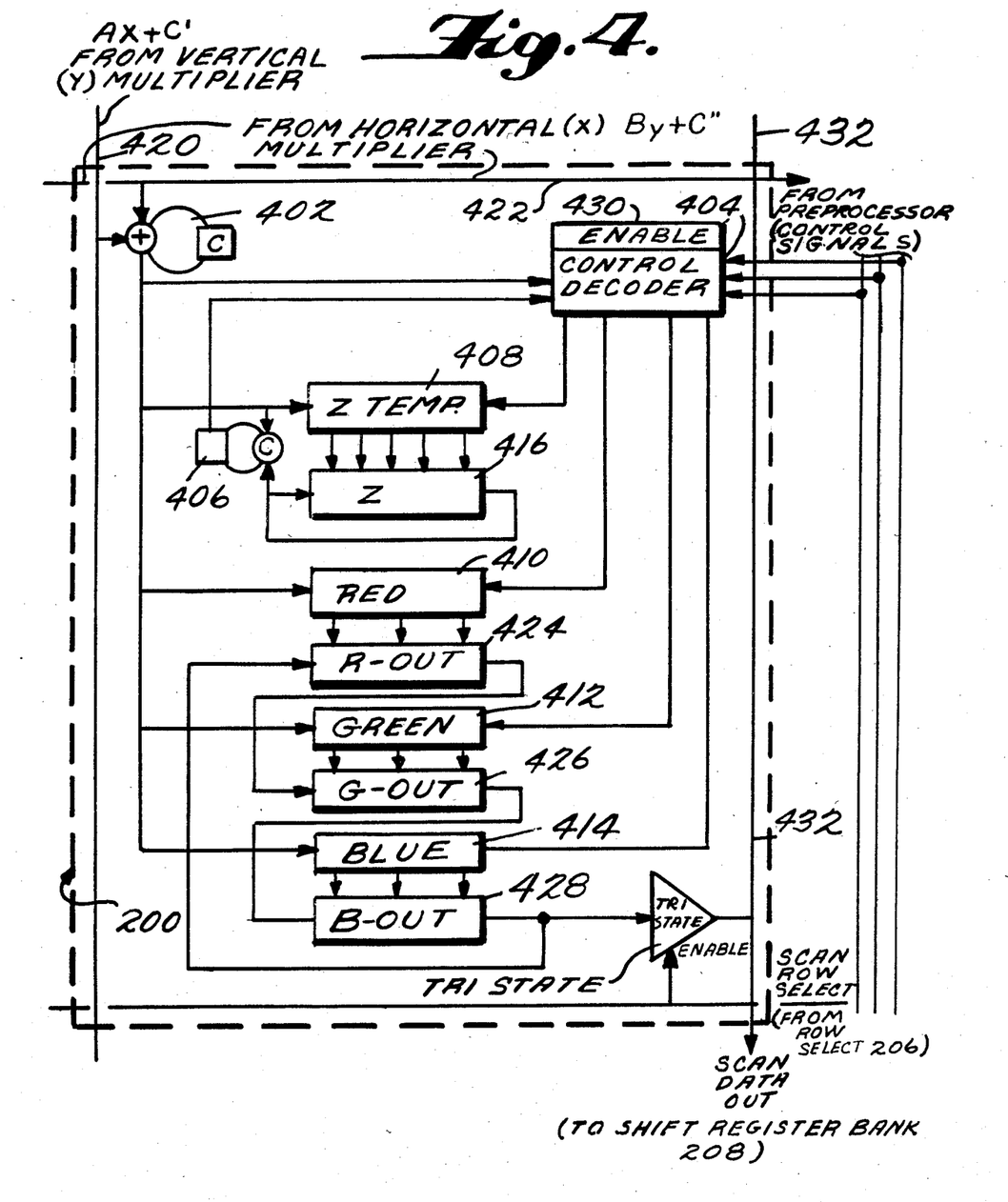
FIG. 4 is a schematic block diagram of an individual enhanced memory cell in accordance with one aspect of the present invention.

Referring now to FIG. 4, each enhanced memory cell 200 suitably comprises a one-bit, adder 402 with carry bit, having the respective associated serial representation of Ax+C' and By+C'' from multiplier trees 202 and 204 applied as the input signals thereto (where x and y are the x and y coordinates of the particular memory cell).

The output of adder 402 is applied to suitable control decoder logic 404, a comparator 406, and respective storage locations (registers) 408, 410, 412 and 414, sometimes hereinafter referred to as the Z temp register 408, red register 410, green register 412 and blue register 414.

As will hereinafter be explained, Z temp register 408 provides temporary storage for calculated values of Z(x,y). Registers 410, 412 and 414 store the respective intensity values R(x,y), G(x,y) and B(x,y), respectively. Z temp register 408 communicates, in parallel, with a register 416, hereinafter sometimes referred to as the Z register 416. Z register 416 provides a second input to comparator 406, and the output of comparator 406 is provided to control decoder 404. As will be explained, Z register 416 is utilized for storing indicia of the lowest z value processed for the pixel.

Red register 410, green register 412 and blue register 414 communicate in parallel with shift registers 424, 426 and 428, respectively (sometimes hereinafter referred to as R-out register 424, G-out register 426 and B-out register 428). R-out register 424, G-out register 426 and B-out register 428 are interconnected to, in effect, form a single parallel-in-serial-out shift register to convert the pixel data to serial signals for transfer to shift register bank 208 (and thereafter to display controller 20 and display device 22). If desired, the serial output of B-out register 428 can be applied as a serial input to R-out register 424 to, in effect, form a circular shift register. Thus, the pixel data is retained in the composite output shift register (424, 426 and 428) until the next successive image values R, G, B are completed and thereafter loaded in parallel into the output shift register 208.

Control signals to registers 408, 410, 412, 414, and shift registers 424, 426 and 428 are provided by control decoder 404. (Signal path to shift registers not shown). Control decoder 404, receives command code signals (e.g. op-code signals) from preprocessor 16, and responsively generates a control signal at a selected output terminal thereof for application to the appropriate device in the memory cell. Control decoder 404 also includes an enable flag, i.e. flip flop, 430.

The operation of system 10 will now be more fully described with reference to FIGS. 1, 2 and 4. Upon system power up, (and thereafter, upon beginning of processing of a new image), an appropriate control signal is generated by host graphics computer 14 to preprocessor 16. Preprocessor 16, in turn, generates a "preset" control signal and applies the signal to each of the individual memory cells 200 in enhanced memory 18. The "preset" control signal is applied to the control decoder 404 in each cell, which generates an appropriate control signal to Z register 416 to cause register 416 to preset to indicia of the most distant value in the coordinate system, e.g., all ones. Preprocessor 16 then generates indicia to host graphics computer 14 that it is ready to accept the first polygon data set.

Host graphics computer 14 then transmits the respective vertex data words corresponding to the first polygon of the frame to preprocessor 16, which temporarily stores the data words. Upon reception of the polygon vertex data, preprocessor 16 generates a "set enable" control signal to each memory cell 200 in enhanced memory 18. The enable control signal is applied to the control decoder 404 in each memory cell 200, which responsively sets enable flip flop 430.

Preprocessor 16 then calculates the coefficients $A_E$, $B_E$, $C'_E$ and $C''_E$ of the function EDGE (x,y) as previously described. The $A_E$ and $C'_E$ coefficients are applied to x multiplier tree 202 and the $B_E$ and $C''_E$ coefficients are applied to y multiplier 204. X Multiplier 202 and y multiplier 204 generate a plurality of signals $A_E x + C'_C$ and $B_E y + C''_E$, respectively, for each value of x and y in the memory cell array of enhanced memory 18. The $A_E x + C'_E$ signals are applied to each memory cell 200 in the column of cells having the corresponding x value. Similarly, each $B_E y + C''_E$ signal are applied to each memory cell 200 in the row having the corresponding y values. More particularly, with specific reference to FIG. 4, the corresponding $A_E x + C''_E$ signal from x multiplier 202 is applied on line 420 as an input signal to the adder 402 of each of the memory cells in the nominal column of the cells. Similarly, the corresponding $B y_E + C''_E$ signal is applied on line 422 as the other input to the adder 402. Adder 420 thus generates a serial signal indicative of $A_E x + B_E y + C'_E + C''_E$. EDGE (x,y) is chosen such that the value is less than or equal to zero for all pixels having coordinates (x,y) on the interior side of the line, and positive for all pixels having coordinates (x,y) on the exterior side of the line. Accordingly, after the value of EDGE (x,y) is calculated, indicia of the sign of the value is provided at the output of adder 402 (a low logic level when the value is positive and a high logic value when negative). A logic AND function is then performed on the output bit of adder 402 and the contents of enable flip flop 430 (hardware not shown). The results of the AND function are then loaded into enable flip flop 430. Thus, if the coordinates of bit cell 200 are on the exterior side of the edge (the pixel is thus not within the polygon), enable flip flop 430 is, in effect, reset to zero. However, if the x,y coordinates of the cell are on the interior side of the edge, and the cell has not already been disabled, the enable bit 430 remains set. The above described process is repeated for each of the polygon edges in sequence. Accordingly, after all of the edges have been so processed, only the pixels having coordinates corresponding to those within the polygon remain enabled.

Preprocessor 16 then calculates the coefficients of the z plane of the polygon as previously described. The coefficients are applied to multiplier trees 202 and 204 which generate the respective serial representations of $A_z x + C'_z$ and $B_z y + C''_z$, respectively. The corresponding $A_z x + C'_z$ and $B_z y + C''_z$ signals are applied to adder 402 in each of the cells 200, and the resultant sum developed and stored in Z-temp register 408.

The newly calculated value for z(x,y) is compared by comparator 402 to contents of z register 416 (initially all one). If the newly calculated z value is greater than the previously stored contents of the Z register, the polygon at that point (pixel) is farther away from the viewing position than some previously processed polygon encompassing the same pixel (x,y coordinate). Accordingly, that portion of the polygon (the particular pixel) is obstructed by the previously processed polygon, and is thus hidden from the designated view point. Enable flip flop 430 is therefore cleared by the output of comparator 406 and the cell is inhibited with respect to further processing of the particular polygon. However, if the newly calculated Z value is less than the contents of the Z register 416, the pixel is unobstructed with respect to the designated viewpoint by any previously processed polygon. Accordingly, the newly calculated z value (in Z-temp register 480) is loaded in Z register 416, replacing its previous contents and the enable bit 430 remains set.

In practice, the comparison step may be accomplished on a bit by bit basis as the new z value is accumulated. More specifically, the output of adder 402 is applied to comparator 406. The contents of Z register 416 are similarly serially applied to the other input of comparator 406. Comparator 406 suitably comprises a one bit subtractor. A bit serial subtraction of the contents of Z register 430 from the newly computed Z value is thus effected. At the conclusion of the computation, the borrow bit of the subtractor is indicative of the results of the comparison, and is applied to control decoder 404 to effect the appropriate action. As should be appreciated, the comparison can in fact be accomplished using only the borrow circuitry of the subtractor.

Preprocessor 16 then computes the coefficients for one of the color intensity planes r(x,y), g(x,y) or b(x,y). The coefficients are applied to multiplier trees 202 and 204 which generate the various $Ax + C'$ and $By + C''$ signals. The appropriate $Ax + C'$ and $By + C''$ signals are applied to the adder 402 of each the enhanced memory cells 200. The resultant sum is applied to the corresponding registers 410, 412 or 414. However, the sum signal is accepted and stored only in those cells which are still enabled. This process is repeated for each of the red, blue and green intensities.

The overall process is repeated for each of the polygons in the frame. Thus, at the end of the frame, the R, G and B registers 410, 412 and 414 of each cell 200 contain the intensity values seen at the corresponding pixel coordinates from the designated viewpoint. Accordingly, at the end of the frame, an appropriate control signal is generated by host graphics computer 14 to preprocessor 16, which in turn generates the appropriate control signal to each of the memory cells 200, causing the contents of registers 410, 412 and 414 to be loaded into shift registers 424, 426 and 428. The next frame of red, blue and green data is then accessed by host graphics computer 14 from storage 12, and the above process repeated.

Raster-like readout of the memory cells is effected to provide control signals to display controller 20. Display controller 20 sequentially generates address control signals to row select logic 206. Row select logic 206 generates an output shift register serial mode enable signal to shift registers 424, 426 and 428 of each cell in the nominal row of cells (all cells corresponding to pixels having a particular y coordinate).

The contents of the respective cumulative shift registers 424, 426 and 428 are then serially output on column data line 432 to shift register bank 208. Shift register bank 208 then transfers the data, pixel by pixel, to display controller 20 to effect control of display 22. Typically, serial input to shift register bank 208 from the respective cells is effected during the horizontal blanking interval of the raster scan. The output of shift register bank 208 occurs during actual raster line scan.

If desired, in view of bandwidth constraints, the respective columns of cells can be nominally divided into a plurality of groups. The groups are chosen so that each group contains respective columns which are maximally displaced in relative position in the image. Data from corresponding cells in each group are concurrently transmitted to respective portions of shift register bank 208 utilizing wide band parallel data paths. The output of the respective portions of shift register 208 are multiplexed to form the data sent to controller 20.

It should be appreciated that system 10 can also be utilized with direct readout, as opposed to raster scan type displays such as, for example, a liquid crystal display. In such case, each memory cell would be directly connected to the input of the corresponding display cell. The display cells are preferably physically disposed overlying the associated memory cell. Many of the provisions for sequential outputting of the cells would not be necessary and can therefore be omitted from enhanced memory 18.

It will be understood that the appended drawings are block schematic in nature, and that various control signal paths and the like are not shown. Further, while various of the conductors/connections are shown in the drawings as single lines, they are not so shown in a limiting sense and may comprise plural conductors/connections as is understood in the art. Moreover, the above description is of preferred exemplary embodiments of the present invention and the invention is not limited to the specific form shown. Modifications may be made in the design and arrangement of the elements without departing from the spirit of the invention as expressed in the appended claims.

What we claim is:

1. A graphics display system comprising:
   a display device including a plurality of individual picture elements (pixels), each said pixel being disposed at a predetermined position in a nominal display coordinate system;
   processor means, responsive to data base signals representative of at least a portion of a visual three dimensional scene and perspective control signals applied thereto, for generating display coordinate data signals representative of said scene portion viewed from a perspective defined by said perspective control signals, said scene including at least one object, said display coordinate data signals comprising sequential representations of the spatial disposition and luminescent intensity of a plurality of component surfaces of said object in said scene portion;
   preprocessor means, responsive to said display coordinate data signals, for selectively generating, in respect of each of said plurality of sequential component surfaces, respective coefficient signals indicative of coefficients of at least one equation representative of respective aspects of said each component surface;
   image buffer means, responsive to said coefficient signals and including a respective individual cell corresponding to each said display device pixel, for determining, at each cell, the value of said equation in parallel at the positions of each said pixel, and selectively storing indicia of intensity values in each cell corresponding to a pixel within the component surface, which pixel is not obstructed from said perspective by any preceding sequential component surface; and
   display control means, responsive to said stored intensity indicia, for controlling said display pixels in accordance with the intensity indicia stored in said image buffer means corresponding individual cell.

2. The system of claim 1 where:
   said aspects include the edges of said component surface, the line of sight distances of said component surface at said pixel positions from said viewpoint, and the intensity values of the pixels enclosed by said component surface; and
   said image buffer means comprises:
   means, responsive to said coefficient signals, for generating, in parallel, respective edge equation value signals corresponding to the value of each edge equation having coefficients in accordance with said coefficient signals, at the coordinates of each of said display pixels and applying said respective equation value signals to the corresponding individual cells;
   means, in each said cell, responsive to said applied edge equation value signals, for determining if the pixel corresponding to said cell is within said component surface, and for selectively disabling said cell in respect of said distance and intensity equation values if said corresponding pixel is not within said component surface;
   means, responsive to said coefficient signals, for generating, in parallel, respective distance equation value signals corresponding to the value of each distance equation having coefficients in accordance with said coefficient signals, at the coordinates of each of said display pixels and applying said respective equation value signals to the corresponding individual cells;
   means, in each said storage cell, selectively responsive to said applied distance equation value signals, for maintaining indicia of the line of sight distance of the closest previous component surface including said corresponding pixel, for determining line of sight distance of said component surface at said corresponding pixel position from said viewpoint, comparing said determined distance with said maintained previously closest distance, and disabling said cell with respect to said intensity equation value signals in respect of said component surface if said component surface is more distant along said line of sight than said previously closest distance; and intensity rendering means, selectively responsive to said applied intensity equation value signals, for developing indicia of the intensity at said corresponding pixel as viewed from said viewpoint.

3. In graphics display apparatus of the type receptive of data base signals indicative of at least a portion of a scene, and including:

a display device having a plurality of individual picture elements;

processor means, responsive to said data base signals and control signals applied thereto, for generating display coordinate data signals representative of said scene portion viewed from a viewpoint defined by said control signals in a predetermined display coordinate system; and an image buffer, including at least one cell corresponding to each pixel in said display, for selectively storing indicia of at least one visual intensity value for said corresponding pixel, the improvement wherein:

each of said cells includes individual processing means, responsive to signals indicative of said display coordinate data signals and control signals applied thereto, for cooperating in the determination of said intensity value for the corresponding pixel.

4. In the apparatus of claim 3 the further improvement wherein said apparatus includes:

preprocessor means, responsive to said display coordinate data signals, for selectively generating respective coefficient data signals representative of the coefficients of predetermined equations; and means, responsive to said coefficient data signals, for generating respective function value signals for each coordinate value in said display coordinate system, said function value signals being applied to the respective individual processor means of the cells corresponding to the pixels having the respective coordinate value.

5. Graphics display apparatus of the type receptive of data base signals indicative of at least a portion of a scene, and including:

a display device having a plurality of individual picture elements (pixels)

processor means, responsive to said data base signal and control signals applied thereto, for generating display coordinate data signals representative of said scene portion viewed from a perspective defined by said; control signals in a predetermined display coordinate system and an image buffer including at least one addressable cell corresponding to respective pixels in said display for selectively storing indicia of at least one visual intensity value for said corresponding pixel, the improvement wherein:

said apparatus further comprises preprocessor means, responsive to said display coordinate data signals, for selectively generating respective coefficient data signals representative of the coefficients of predetermined equations associated with said display coordinate data; and said image buffer comprises:

means, responsive to said coefficient data signals, for generating respective equation value signals corresponding to each operative coordinate in said display coordinate system; and at least one respective individual cell corresponding to each pixel in said display, said cell responsive to the equation value signals corresponding to the coordinates of said corresponding pixel, for cooperatively determining the intensity value of said corresponding pixel in said scene portion as viewed from said perspective.

6. The apparatus of claim 5 wherein said display coordinate data defines at least one closed unit surface in said scene portion, and wherein each said cell includes:

unit definition means, selectively responsive to said corresponding coordinate equation value signals and to initialization signals applied thereto, for selectively disabling said cell with respect to said equation value signals;

means, selectively responsive to said corresponding coordinate equation value signals and to preset signals applied thereto, for maintaining indicia of the unit surface previously closest along the line of sight from the corresponding pixel to said defined perspective, and for disabling said cell with respect to said equation value signals in respect of unit surfaces further from said perspective then said previously closest unit surface; and intensity rendering means, selectively responsive to said corresponding coordinate equation value signals, for developing indicia of said corresponding pixel intensity in respect of a unit surface only if said unit surface at said corresponding pixel is not obstructed by any unit surface previously closer along the line of sight from said corresponding pixel to said defined perspective.

7. A method of generating a graphic display of a scene as viewed from a defined perspective utilizing a display device having a plurality of individual pixel elements, and a frame buffer including a respective cell corresponding to each said pixel, each said cell being capable of at least an enable state whereby said cell is receptive of data signals applied thereto and an inhibited state wherein said cell is not responsive to data signals applied thereto, said scene being represented by data signals defining a sequence of respective component surfaces of said scene in respect of spatial disposition and intrinsic visual intensity, comprising the steps of:

(a) repeating in respect of each component surface in sequence:

(a1) initializing the enable/inhibit state of each of said respective cells;

(a2) generating signals indicative of the coefficients of an equation of an edge of said component surface as a function of the coordinates of said display device pixels;

(a3) generating, from said edge coefficient signals, in parallel at each said cell, respective signals indicative of the respective value of said edge equation for each value of said coordinates of said pixels;

(a4) selectively adjusting the enable/inhibit states of individual cells in accordance with the value of said edge equation at the coordinates of said corresponding pixel;

(a5) repeating steps a2, a3, and a4 for each edge of said component surface;

(a6) generating signals indicative of the coefficients of an equation indicative of the visual intensities of the respective pixels within said component surfaces as a function of the coordinates of said pixels;

(a7) generating, in parallel at each said cell, from said intensity plane equation coefficients, respective signals indicative of the respective value of visual intensity for each value of coordinates of said pixels;

(a8) selectively storing, in each of said cells in an enabled state, the respective value of visual intensity at the coordinates of the corresponding pixel; and (b) controlling said display device in accordance with the respective intensity values stored in said individual cells after repeating the above steps (a) in respect of all said component surfaces.

8. The method of claim 7 wherein steps (a) in respect of each component surface include before said selectively storing step (a8):

generating signals indicative of the coefficients of an equation representing the distance of said component surface from said defined viewpoint as a function of the coordinates of said pixels;

generating, in parallel at each said cell, from said distance coefficient signals, respective signals indicative of the respective value of said distance equation at the coordinates of each of said pixels; and selectively disabling said respective cells in accordance with said distance equation value at the coordinates of said corresponding pixel.

9. Apparatus for generating a graphic display of a scene as viewed from a defined viewpoint, comprising:

means for generating sequential sets of data signals defining a sequence of respective component surfaces of said scene in respect of spatial disposition and intrinsic visual intensity;

a display device having a plurality of individual pixel elements;

a frame buffer including a respective cell corresponding to each said pixel element, each said cell being capable of at least an enabled state whereby said cell is receptive of data signals applied thereto and an inhibited state wherein said cell is non-responsive to data signals applied thereto;

means, responsive to said data signal sets, for initializing the enable/inhibit state of each said respective cells in respect of each sequential component surface;

means, responsive to said data signal sets, for generating, in sequence, signals indicative of the coefficients of equations representative of the respective edges of said defined component surface as a function of the coordinates of said display device pixels;

means at each of said cells responsive to said edge coefficient signals, for generating, for each said edge equation in sequence, sets of signals indicative of the respective valeus of said edge equation at the respective coordinates of said pixels;

means, for selectively adjusting the enable/inhibit states of individual cells in accordance with the value of said edge equation at the coordinates of said corresponding pixel;

means, at said cells responsive to each said data signal set in sequence, for generating, in parallel, signals indicative of the coefficients of an equation indicative of the visual intensities of the respective pixels within said defined component surface as a function of the coordinates of said pixels;

means, responsive to said intensity equation coefficient signals, for generating a set of signals indicative of the respective values of said intensity at the coordinates of said pixels;

means for selectively storing, in each of said cells in an enabled state, the respective value of visual intensity of said defined component surface at the coordinates of the corresponding pixel; and means for controlling said display device in accordance with the respective intensity values stored in said individual cells after the data signal sets in respect of all said component surfaces have been responded to.

10. The apparatus of claim 9 further including:

means, responsive to said data signal sets in sequence, for generating signals indicative of the coefficients of an equation representing the distance of the pixels in said defined component surface from said defined viewpoint as a function of the coordinates of said pixels;

means at said cells responsive to said distance plane coefficient signals, for generating, in parallel for each pixel, a set of respective signals indicative of the respective values of said distance equation at the coordinates of each of said pixels; and means for selectively disabling said respective cells prior to operation of said means for selectively storing in accordance with said distance equation value at the coordinates of said corresponding pixel.

11. The apparatus of claim 3 further comprising means for generating substantially concurrent, substantially indentical control signals to the individual processing means of each of said cells.

12. A system for displaying an image on a display, said display including a plurality of respective display elements, said system comprising:

display parameter calculating means for calculating at least one display parameter, said calculating means comprising:

(1) an array of respective cells, each of said display elements associated with at least one of said cells, each of said respective cells comprising:

(a) adding means for calculating an intensity value for the display element associated with said cell in response to information transmitted to said cell, and (b) means for storing said calculated intensity value; and (2) multiplying means for transmitting said information representing an image to be displayed, comprising distinct combination of data input thereto, to each of said cells; and means for controlling said plurality of display elements in response to said stored intensity values.

13. A system as in claim 12 wherein said multiplying means includes:

means for producing a plurality of signals representing said image, predetermined ones of said plurality of signals representing predetermined portions of said image; and means for applying said plurality of signals to said array.

14. A system as in claim 13 wherein said applying means applies a different combination of said plurality of signals to each cell in said array, predetermined combinations of said plurality of signals representing predetermined portions of said image.

15. An apparatus as in claim 14 wherein said array further includes means for arranging said cells in a predetermined manner, the combination of said plurality of signals applied to each cell being determined by the position of the cell in said array.

16. A system as in claim 15 wherein the relative positions of said cells in said array correspond to the relative positions on said display of the display elements associated with said cells.

17. A system as in claim 14 wherein said parameter calculating means further includes:
means for defining a viewing plane, each of said cells in said array associated with a predetermined point on said viewing plane, and
projecting means for projecting a representation of at least a first surface in a three-dimensional scene onto said viewing plane,
wherein the combination of signals applied to any cell represents the projection of the representation of said first surface onto the predetermined point of said viewing plane associated with said any cell.

18. A system as in claim 17 wherein:
said calculating means further includes means for specifying at least one aspect of said projection by coefficients of a predetermined planar equation;
said plurality of signals producing means includes:
tree processing means for multiplying, in parallel, a plurality of values of coordinates of said viewing plane by said coefficients to obtain a plurality of products, and
means for converting said products into said plurality of signals; and
wherein said adding means in each of said cells combines the ones of said plurality of signals applied thereto to obtain the value of said planar equation at the point of said viewing plane associated with said each cell.

19. A system as in claim 18 wherein said specifying means successively specifies, by said coefficients, at least two of:
the position of said projection on said viewing plane,
the depth of said first surface in said three-dimensional scene, and
the shading of said first surface.

20. A system as in claim 19 wherein each of said cells further includes comparing means, responsive to said combination of signals, for the determining whether the point on said viewing plane associated with said cell is enclosed by said projected representation.

21. A system as in claim 20 wherein comparing means also determines whether the view of said first surface is hidden by another surface in said scene having a depth in said scene, with respect to a predetermined viewing perspective, less than the depth of said first surface.

22. A system as in claim 19 wherein each of said cells further includes comparing means, responsive to said combination of signals, for determining whether the view of said first surface is hidden by another surface in said scene having a depth in said scene, with respect to a predetermined viewing perspective, less than the depth of said first surface.

23. A system as in claim 22 wherein each of said cells further includes means for storing the depth of said another surface, said comparing means also responsive to said stored depth.

24. A system as in claim 17 wherein said plurality of signals producing means includes means for successively specifying, by said combination of signals, at least two of:
the position of said projection on said viewing plane,
the depth of said surface in said three-dimensional scene, and
the shading of said first surface.

25. A system as in claim 24 wherein each of said cells further includes comparing means, responsive to said combination of signals applied to said cell, for determining whether the point on said viewing plane associated with said cell is enclosed by said projected representation.

26. A system as in claim 25 wherein said comparing means also determines whether the view of said first surface is hidden by another surface in said scene having a depth in said scene, with respect to a predetermined viewing perspective, less than the depth of said first surface.

27. A system as in claim 24 wherein each of said cells further includes comparing means, responsive to said combination of signals applied to said cell, for determining whether the view of said first surface is hidden by another surface in said scene having a depth in said scene, with respect to a predetermined viewing perspective, less than the depth of said first surface.

28. A system as in claim 27 wherein each of said cells further includes means for storing the depth of said another surface, said comparing means also responsive to said stored depth.

29. A system as in claim 17 wherein said plurality of signals producing means includes means for offsetting the levels of the signals applied to at least a first cell by a predetermined amount from the levels of the signals applied to at least a second cell associated with a point of said viewing plane which is adjacent to the point of said viewing plane represented by said first cell.

30. A system as in claim 14 wherein said adding means of each of said cells combines the signals applied to said each cell to obtain said intensity value.

31. A system as in claim 14 wherein:
said plurality of signals producing means includes means for setting each of said plurality of signals to a value proportional to a coefficient of a planar equation; and
said adding means of each of said cells combines the values of the signals applied thereto to obtain a value of said planar equation.

32. A system as in claim 12 wherein:
said calculating means further includes:
means for defining a viewing plane, each of said cells in said array being associated with a predetermined point on said viewing plane,
means for defining a three-dimensional scene to be imaged, said scene including at least a first surface, and
projecting means for projecting a representation of said first surface onto said viewing plane;
said multiplying means includes means for transmitting the position of the projection of said representation on said viewing plane and the depth, from a predetermined viewing perspective, of said first surface in said scene; and
each of said cells further includes comparing means for successively determining, in response to said transmitted information, whether the point on said viewing plane associated with said each cell is enclosed by said projection and whether the view of said first surface is hidden by another surface in said scene having a depth in said scene, with respect to said predetermined viewing perspective, less than the depth of said first surface.

33. A system as in claim 32 wherein each of said cells further includes means for storing the depth of said another surface, said comparing means also being responsive to said stored depth.

34. A system as in claim 32 wherein each of said cells further includes disabling means, responsive to the determination of said comparing means, for selectively disabling said comparing and adding means from responding to said transmitted information.

35. A method for displaying an image on a display having a plurality of respective display elements, said method comprising the steps of:
(1) deriving a plurality of different signals representing corresponding different portions of an object to be displayed from at least one value specifying said object;
(2) applying a unique combination of said plural signals to an input of each cell in an array of respective cells, each of said display elements associated with at least of one of said cells;
(3) calculating, at each of said cells, an intensity value for the display element associated with said cell in response to at least one said combination of signals applied thereto by said applying step (2);
(4) storing said calculated intensity value at each of said cells; and
(5) controlling said plurality of display elements in response to said stored intensity values.

36. A method as in claim 35 wherein said controlling step (5) includes the step of applying to said display elements intensity values stored in cells having positions in said array corresponding to the relative position of the display elements on said display.

37. A method as in claim 35 further including:
defining a viewing plane, each of said cells in said array associated with the predetermined point on said viewing plane;
projecting a representation of at least a first surface of said object in a three-dimensional scene onto said viewing plane; and
representing, by the combination of signals applied to each cell, the projection of the representation of said first surface onto the predetermined point of said viewing plane associated with said cell.

38. A method as in claim 37 wherein:
said method further includes specifying at least one aspect of said projection by coefficients of a predetermined planar equation;
said step of deriving a plurality of signals includes:
multiplying, in parallel, a plurality of values of coordinates of said viewing plane by said coefficients to obtain a plurality of products, and
converting said products into said plurality of signals; and
said calculating step (3) includes combining the ones of said plurality of signals applied to said cells to obtain the value of said planar equation at the points of said viewing plane associated with said cells.

39. A method as in claim 38 wherein said aspect-specifying step includes successively performing at least two of:
specifying the position of said projection on said viewing plane;
specifying the depth of said first surface in said three-dimensional scene; and
specifying the shading of said first surface.

40. A method as in claim 39 further including the step of determining at each cell, in response to said combination of signals applied thereto, whether the point on said viewing plane associated with said cell is enclosed by said projected representation.

41. A method as in claim 40 further including the step of determining at each cell, in response to said combination of signals applied thereto, whether the view of said first surface is hidden by another surface in said scene having a depth in said scene, with respect to a predetermined viewing perspective, less than the depth of said first surface.

42. A method as in claim 39 further including the step of determining at each cell, in response to said combination of signals applied thereto, whether the view of said first surface is hidden by another surface in said scene having a depth in said scene, with respect to a predetermined viewing perspective, less than the depth of said first surface.

43. A method as in claim 42 further including the step of storing the depth of said another surface at each of said cells, said hidden surface determining step also being responsive to said stored depth.

44. A method as in claim 37 wherein said deriving step (1) includes the step of successively performing at least two of the steps of:
specifying the position of said projection on said viewing plane;
specifying the depth of said surface in said three-dimensional scene; and
specifying the shading of said first surface.

45. A method as in claim 44 further including the step of determining, at each of said cells in response to said signals applied thereto, whether the point on said viewing plane associated with said cell is enclosed by said projection.

46. A method as in claim 45 further including the step of determining, at each of said cells in response to said signals applied thereto, whether the view of said first surface is hidden by another surface in said scene having a depth in said scene, with respect to a predetermined viewing perspective, less than the depth of said first surface.

47. A method as in claim 44 further including the step of determining, at each of said cells in response to said signals applied thereto, whether the view of said first surface is hidden by another surface in said scene having a depth in said scene, with respect to a predetermined viewing perspective, less than the depth of said first surface.

48. A method as in claim 47 further including storing, at each of said cells, the depth of said another surface, said hidden surface determining step also responsive to said stored depth.

49. A method as in claim 37 wherein said deriving step (1) includes offsetting the levels of the signals applied to at least a first cell by a predetermined amount from the levels of the signals applied to at least a second cell associated with a point of said viewing plane which is adjacent to the point of said viewing plane represented by said first cell.

50. A method as in claim 35 wherein said calculating step (3) includes the step of combining at each cell the signals applied thereto.

51. A method as in claim 35 wherein:

said deriving step (2) includes the step of defining a planar equation representative of said image, said equation having at least one coefficient;
said applying step includes the step of applying values proportional to said coefficient to said cells; and
said calculating step (3) includes a step of deriving, at each said cell, a value of said planar equation from the values of the signals applied thereto.

52. A method as in claim 35 wherein:
said method further includes the steps of:
defining a viewing plane, each of said cells in said array associated with a predetermined point on said viewing plane,
defining a three-dimensional scene to be imaged, said scene including at least a first surface, and projecting a representation of at least said first surface onto said viewing plane;
said applying step (2) includes the step of applying signals representing the position of the projection of said representation on said viewing plane and the depth of said first surface in said scene to said array of cells; and
said method further includes the step of successively performing at least two of:
determining, at each of said cells in response to said applied signals, whether the point on said viewing plane associated with said cell is enclosed by said projection, and
determining, at each of said cells in response to said transmitted information, whether the view of said first surface is hidden by another surface in said scene having a depth in said scene, with respect to a predetermined viewing perspective, less than the depth of said surface.

53. A method as in claim 52 further including the step of storing, at each cell, the depth of said another surface, said hidden surface determining step also being responsive to said stored depth.

54. A method as in claim 52 further including the step of selectively disabling, at each of said cells, the performance of said enclosure determining step, hidden surface determining step and calculating step (3).

* * * * *